United States Patent [19]

Hill

[11] 3,989,811

[45] Nov. 2, 1976

[54] PROCESS FOR RECOVERING SULFUR FROM FUEL GASES CONTAINING HYDROGEN SULFIDE, CARBON DIOXIDE, AND CARBONYL SULFIDE

[75] Inventor: Earl S. Hill, Orinda, Calif.

[73] Assignee: Shell Oil Company, Houston, Tex.

[22] Filed: Nov. 10, 1975

[21] Appl. No.: 630,580

Related U.S. Application Data

[63] Continuation of Ser. No. 545,692, Jan. 30, 1975, abandoned.

[52] U.S. Cl. .............................. 423/573 G; 55/56; 55/68; 55/73; 55/48; 423/226; 423/228; 423/229
[51] Int. Cl.² ................... C01B 17/04; B01D 53/14
[58] Field of Search ................ 55/48, 56, 68, 73; 423/226, 228, 229, 243, 573

[56] References Cited

UNITED STATES PATENTS

| | | | |
|---|---|---|---|
| 3,098,705 | 7/1963 | Bally | 423/243 |
| 3,347,621 | 10/1967 | Papadopoulos et al. | 55/73 X |
| 3,502,428 | 3/1970 | Gelbein et al. | 55/73 X |
| 3,664,091 | 5/1972 | Hegwer | 55/73 X |

Primary Examiner—Charles N. Hart
Assistant Examiner—Richard W. Burks
Attorney, Agent, or Firm—Albert J. Adamcik

[57] ABSTRACT

Sour gas streams containing significant quantities of $H_2S$, $CO_2$, and COS are contacted with an aqueous absorbent to remove the acid gases, the acid gases are described and contacted with a selective absorbent which rejects a substantial quantity of the $CO_2$, and the $H_2S$ enriched absorbent is stripped to produce a feed suitable for Claus units.

12 Claims, 1 Drawing Figure

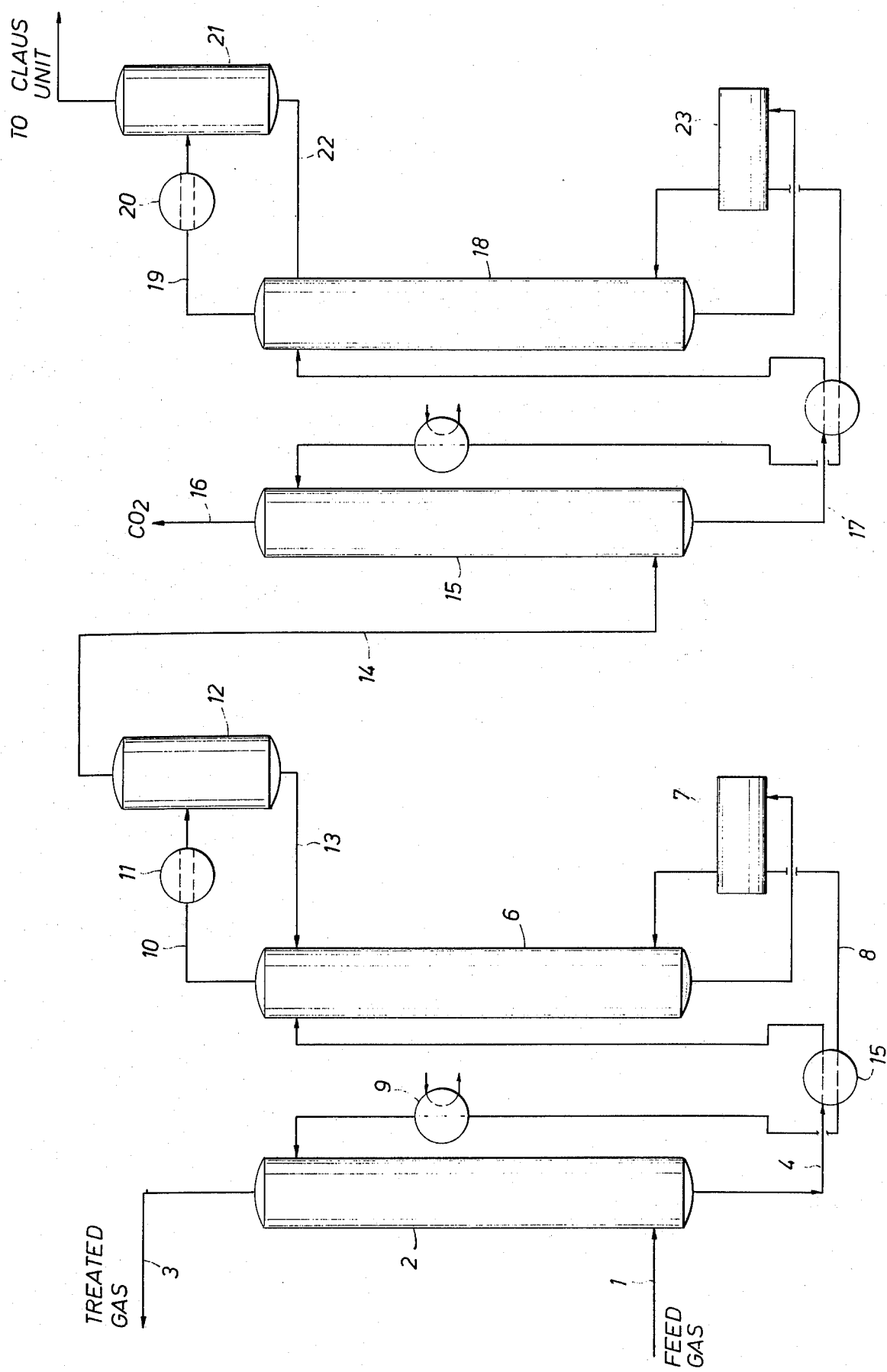

PROCESS FOR RECOVERING SULFUR FROM FUEL GASES CONTAINING HYDROGEN SULFIDE, CARBON DIOXIDE, AND CARBONYL SULFIDE

This is a continuation of application Ser. No. 545,692, filed Jan. 30, 1975 and now abandoned.

BACKGROUND OF THE INVENTION

The hydrogen sulfide content of some naturally occurring gases, synthesis gases, process gases, and fuel gases produced by gasification procedures, e.g., gases produced by the gasification of coal, petroleum, shale, tar sands, etc., is often at environmentally unacceptable levels. In order to meet increasingly stringent total sulfur content requirements, effective procedures for removal of this contaminant from these "sour" gases are necessary.

One problem associated with the removal of $H_2S$ from such streams is that the gases mentioned also commonly contain significant amounts of $CO_2$ and COS. If the ratio of these gases to $H_2S$ is high, difficulty is experienced in removing the $H_2S$ selectively by absorption since the $CO_2$ and COS will also tend to be absorbed. Obviously, any $CO_2$ and COS removed with the $H_2S$ must be contended with in further treatment steps. Although the $CO_2$ can be vented, if separated from the $H_2S$, the COS cannot because of its poisonous character. On the other hand, the desorption characteristics at COS are similar to those of $CO_2$, so that separation techniques are complicated. Finally, the diluting effect of large amounts of $CO_2$ renders the practice of the "Claus Process" (in which $H_2S$ is reduced to elemental sulfur) impractical or impossible. Aside from other considerations, capital costs necessary for recycle of large volumes of $CO_2$, etc., would be prohibitive. Accordingly, there exists a genuine need for an economical method for removal of $H_2S$, and $CO_2$ and COS (so-called acid gases) from desired gaseous streams which avoids these problems and disadvantages.

SUMMARY OF THE INVENTION

The present invention overcomes the difficulties mentioned by providing a method for removal of the acid gas content from desired gases which non-selectively removes the $H_2S$, $CO_2$ and COS from the gas, provides for hydrolysis of the COS in the removal step, concentrates the $H_2S$ by separation of a substantial amount of the $CO_2$ therefrom, and provides for recovery of the $H_2S$ as elemental sulfur. Off-gases from the sulfur recovery unit (Claus unit) may be processed to provide effluent which is well within limits established by pollution control requirements.

More particularly, the invention comprises a process for the removal of acid gases, i.e., $H_2S$, $CO_2$, and sulfur-containing compounds, including $CS_2$, COS, and various mercaptans, from sour gases, comprising, (A) contacting the sour gas in an absorption zone and absorbing the acid gases with a non-selective aqueous absorbent mixture and hydrolyzing the COS and producing a sweet product gas stream and a loaded absorbent stream; (B) stripping the acid gas-loaded absorbent stream and producing an acid gas stream containing principally $H_2S$ and $CO_2$, (C) selectively absorbing $H_2S$ from the acid gas stream to produce a $CO_2$ containing-stream and an $H_2S$-rich absorbent; (D) regenerating the $H_2S$-rich absorbent to produce an acid gas stream containing a high percentage of $H_2S$; (E) recovering the $H_2S$ in the acid gas stream as elemental sulfur by reaction of the $H_2S$ with $O_2$. As indicated, off-gases from the sulfur recovery step are processed by procedures known to those skilled in the art.

According to the first step of the process, the sour gas stream is contacted in a first or primary absorption zone in a manner that will absorb $H_2S$, $CO_2$, and COS from the gas in as effective manner as possible. Any of the known absorbents conventionally used may be employed. For example, aqueous alkali metal carbonate and phosphate solutions, e.g. aqueous potassium and sodium carbonate and phosphate, and certain aqueous alkanolamines, such as alkyl diethanolamines, may be used. If a selective alkanolamine is employed a physical solvent is used to enhance the absorption of the COS. Suitable alkanolamines include methyldiethanolamine, triethanolamine, or one or more dipropanolamines, such as di-n-propanolamine or diisopropanolamine. Aqueous methyldiethanolamine, triethanolamine and dipropanolamine solutions are preferred absorbents, particularly aqueous diisopropanolamine and methyldiethanolamine solutions. As especially preferred absorbent for treating gases at higher pressures, e.g., natural gas at pressures of 100 to 1200 p.s.i.g., in an aqueous diisopropanolamine solution which additionally contains a minor amount of a physical solvent such as a substituted or unsubstituted tetramethylene sulfone. Either high purity diisopropanolamine may be used or technical mixtures of dipropanolamine such as are obtained as the by-product of diethanolamine production may be used. Such technical mixtures normally consist of more than 90% by weight of diisopropanolamine and 10% by weight or less of mono- and tri-propanolamines and possibly trace amounts of diethanolamine. Concentrations of aqueous alkanolamine solutions may very widely, and those skilled in the art can adjust solution concentrations to achieve suitable absorption levels. In general, the concentration of alkanolamine in aqueous solutions will be from 5 to 60% by weight, and preferably between 25 and 50% by weight. If a physical solvent is employed as a component of the absorbent liquid, it can be present in an amount of from 2 to 50% by weight, preferably from 5 to 45% by weight.

As indicated, the preferred absorbent liquid for treating COS containing streams contains a significant amount of a tetramethylene sulfone (the unsubstituted compound is known as sulfolane). Suitable sulfolanes (substituted) and unsubstituted) contain from zero to two substituent radicals which are selected from alkyl of from 1 through 4 carbon atoms, with a total of 4 alkyl carbon atoms, the alkyl radicals being attached to different ring carbon atoms. Preferred substituted sulfolanes are those having methyl substituents. Representative substituted sulfolanes are 2-methyl sulfolane, 3-methyl sulfolane, 2,3-dimethyl solfolane, 2,4-dimethyl sulfolane, 3,4-dimethyl sulfolane, 3-ethyl sulfolane and 2-methyl 5-propyl sulfolane. Sulfolane is a particularly preferred physical solvent for use in conjunction with diisopropanolamine absorbent.

Suitable temperature and pressure relationships for different hydrogen sulfide-selective absorbents are known, or can be calculated by those skilled in the art. The temperatures employed in the primary absorption zone are not critical, and a relatively wide range of temperatures, e.g., from 0° to 100° C may be utilized. A range of from about 0° to about 85° C is preferred. In many commercial applications, such as the removal of $H_2S$ from natural gas to meet pipeline specifications, absorption at ambient temperatures is preferred since the cost of refrigeration would exceed the benefits obtained due to increased absorption at the lower temperature. However, in certain applications, such as the treatment of acid gas mixtures containing relatively high concentrations of $CO_2$ vis-a-vis $H_2S$, absorption is conducted at relatively low temperatures, i.e., below 30° C, and preferably below 10° C, even though refrigeration of the solvent and/or feed may be required. Contact times will range from about 1 second to about 60 seconds, with contact times of 5 seconds to 50 seconds being preferred.

Similarly, in the primary regeneration or stripping zone, temperatures may be varied widely, the only requirement being that the temperature be sufficient to reduce the $H_2S$ content in the absorbent to a level which corresponds to an equilibrium loading for an $H_2S$ content having less than 50 percent (preferably 10 percent) of the $H_2S$ content of the treated gas. The term "equilibrium loading" may be defined as that amount of $H_2S$ in the liquid absorbent which is in equilibrium with the amount of $H_2S$ in the treated gas leaving the absorber, at the temperature and pressure at top of the absorber. Equilibrium loading conditions for $H_2S$ and $CO_2$ at varying concentrations, temperatures and pressures for different hydrogen-selective absorbents are known or can be calculated by known methods and hence need not be detailed herein. In general, temperatures of from about 90° C to 180° C, preferably from 100° C to 170° C, may be employed.

Pressure conditions in the primary absorption zone may vary widely, depending on the pressure of the gas to be treated. For example, pressures in the absorption zone may vary from one atmosphere up to 150 or even 200 atmospheres. Pressures of from 1 atmosphere to about 100 atmospheres are preferred. In the primary regeneration or desorption zone, pressures will range from about 1 atmosphere to about 3 atmospheres. As noted, the pressure-temperature relationships involved are well understood by those skilled in the art, and need not be detailed herein.

In the second step at the process, the acid gas (principally $H_2S$ and $CO_2$) — and now freed of COS — is passed to a selective absorption zone wherein $H_2S$ is selectively absorbed and a substantial portion of the $CO_2$ is rejected. The particular absorbents, temperatures, pressures, etc. employed in this secondary absorption zone are a matter of choice, provided the desired selection of $H_2S$ and rejection of $CO_2$ are achieved. In general, the absorbents employed in the primary absorption zone may be employed. However, although general composition, temperature, and pressure conditions are similar, adjustment must be made to give the desired selection of $H_2S$. For example, use may be made of that process described in Canada Pat. No. 947,045, issued May 14, 1974. In the patented process $H_2S$ is selectively removed from a hydrogen sulfide and carbon dioxide containing gaseous mixture by contacting the gaseous mixture with an aqueous solution of a hydrogen sulfide-selective absorbent in an absorption column having fewer than 20 contacting trays. The trays have an average dry tray pressure drops of from about 1.0 to about 5 inches of liquid, and a gas velocity of at least 1 meter per second, preferably 2 to 4 meters per second, is maintained. A treated gas containing less than 10% of the hydrogen sulfide present in the gaseous feed but more than 50% of the carbon dioxide present in the feed, and a hydrogen sulfide and carbon dioxide-enriched absorbent solution are obtained. The hydrogen sulfide and carbon dioxide-enriched absorbent solution is then passed to a regenerating zone and the absorbent is stripped to a hydrogen sulfide content which corresponds to an equilibrium loading for a hydrogen sulfide content having less than 50 percent (preferably less than 10 percent) of the hydrogen sulfide content of the treated gas. The regenerated absorbent solution is then returned for contact with the hydrogen sulfide and carbon dioxide-containing gaseous mixture, and the liberated $H_2S$, etc., is passed for further processing. As indicated, any alkaline absorbent solution which has an appreciably greater affinity for $H_2S$ than for $CO_2$, (i.e., is "hydrogen sulfide-selective") can be employed in the invention.

Liberated $H_2S$ is preferably treated by that process known as the "Claus" process. In the "Claus" process, elemental sulfur is prepared by partial oxidation of the $H_2S$ to sulfur dioxide, using an oxygen-containing gas (including pure oxygen), followed by the reaction of the sulfur dioxide with the remaining part of the hydrogen sulfide, in the presence of a catalyst. This process, which is used frequently at refineries, and also for the workup of hydrogen sulfide recovered from natural gas, is carried out in a plant which typically comprises a combustion chamber followed by one or more catalyst beds between which are arranged one or more condensers in which the reaction products are cooled and the separated liquid elemental sulfur is recovered. Since the yield of recovered elemental sulfur, relative to the hydrogen sulfide introduced, is not quantitative, a certain amount of unreacted hydrogen sulfide and sulfur dioxide remains in the Claus off-gases. These gases are normally incinerated in a furnace or treated in other ways knwon to those skilled in the art. To some extent, the amount of elemental sulfur recovered depends on the number of catalyst beds employed in the Claus process. In principle, 98% of the total sulfur available can be recovered when three beds are used.

IN THE DRAWING:

The drawing shows a flow chart for the process.

DETAILED DESCRIPTION OF THE INVENTION

In order to describe the invention in greater detail, reference is made to the accompanying drawing. The values given herein relating to temperatures, pressures, compositions, etc., should be considered merely exemplary and not as delimiting the invention.

Sour gas containing a low ratio of $H_2S$ to $CO_2$, e.g. natural gas, in line 1 enters absorption column 2 (tray type) which contains an absorbent composed of 40 percent diisopropanolamine, 15 percent $H_2O$, and 45 percent sulfolane (all percentages by weight). The pressure of the feed gas is about 1200 p.s.i.g., and the temperature of the lean absorbent is about 45° C. A contact time of about 10 seconds is employed in order to absorb virtually all $H_2S$, $CO_2$, and COS. Under these conditions, the COS is rapidly absorbed and the bulk of it is hydrolyzed to $CO_2$ and $H_2S$. The $CO_2$ and $H_2S$ formed are absorbed immediately, and purified or "sweet" gas leaves absorption column 2 through line 3. Loaded or rich absorbent, i.e. absorbent containing the absorbed $H_2S$ and $CO_2$, is passed through line 4 through heat exchanger 5 where heat is imparted to the stream. The stream is then regenerated in stripping column 6 to free the $H_2S$ and $CO_2$ from the absorbent, and additional heat is provided by reboiler 7. Other types of regenerating units may be used. The temperature in the bottom of stripping column 6 is about 132° C, while the temperature at the top of the column will be about 90° C. Pressure is maintained in the stripping column at about 10 p.s.i.g. As will be apparent to those skilled in the art, temperatures and pressures may be adjusted to provide the appropriate concentration of $H_2S$ and $CO_2$ is the lean absorbent returned to column 2 to provide the degree of stripping desired.

The stripped or "lean" absorbent is returned, preferably, through line 8, through heat exchanger 5 and cooler 9 to absorption column 2. From regeneration column 6, the liberated acid gases, i.e., $H_2S$ and $CO_2$, are passed through line 10 through cooler 11. Condenser 12 provides for collection of carryover absorbent (including water), and is normally operated at 20° C to 50° C below the temperature in the top of stripping column 6. Condensed absorbent and water are returned via line 13 to regeneration column 6.

As this point, the gas stream leaving condenser 12 is composed almost exclusively of $CO_2$ and $H_2S$ saturated with water vapor. This stream cannot be processed in a Claus plant, as indicated earlier, since the ratio of $H_2S$ to $CO_2$ would be too low. The invention, therefore, provides for the removal of the bulk of the $CO_2$ from the stream, thus increasing the ratio of $H_2S$ to $CO_2$.

Accordingly, the $CO_2/H_2S$ stream is passed through line 14 to absorption column 15. Absorption column 15 is a 12 tray column and is operated in a manner which will reject the $CO_2$, but absorb $H_2S$. For example, a liquid absorbent containing about 27 percent diisopropanolamine and about 73 percent water is used. The temperature of the lean absorbent is about 40° C and a pressure of about 7 p.s.i.g. is maintained. The trays have an average dry tray pressure drop of 2 to 3 inches of liquid, and velocity of the stream is about 2 meters per second. $CO_2$ is vented continuously through line 16, while the $H_2S$-rich absorbent is passed continuously through line 17 to regeneration column 18.

Desorption column 18 is operated much in the fashion of column 6, except that the $CO_2$ and $H_2S$ contents are regulated to return the desired lean mixture back to column 15. The liberated gas stream, now containing 15 percent to 75 percent by volume $H_2S$ (preferably 25 percent through 70 percent), the balance being $CO_2$, is passed through line 19 through heat exchanger 20 and condenser 21. In condenser 21, carryover absorbent is collected and returned via line 22 to column 18. Lean solvent is returned to column 15 via reboiler 23. $H_2S$ from condenser 21 is passed to a Claus unit for conversion to elemental sulfur. off-gases from the Claus units may be processed according to techniques known to those skilled in the art.

While the invention has been illustrated with respect to particular apparatus, those skilled in the art will recognize that other equivalent or analogous units may be employed. Again, all pumps, valves, etc. have not been illustrated, as much expedients can readily be supplied by those familiar with the art.

I claim as my invention:

1. A method for reducing the acid gas content of sour gases, comprising:
   A. contacting the sour gas in an absorption zone and absorbing the acid gases with a non-selective aqueous absorbent mixture and hydrolyzing the COS and producing a sweet product gas stream and an acid gas-loaded absorbent stream;
   B. stripping the acid gas-loaded absorbent stream and producing an acid gas stream containing principally $H_2S$ and $CO_2$;
   C. selectively absorbing $H_2S$ from the acid gas stream to produce a $CO_2$ containing stream and an $H_2S$-rich absorbent;
   D. regenerating the $H_2S$-rich absorbent to produce an acid gas stream containing $H_2S$;
   E. recovering the $H_2S$ in the acid gas stream as elemental sulfur by oxidation of the $H_2S$ with an oxygen containing gas.

2. The method of claim 1 wherein the non-selective aqueous absorbent mixture of step (A) comprises an aqueous alkanolamine containing from 2 to 50 percent by weight of a tetramethylene sulfone.

3. The method of claim 2 wherein the $H_2S$ is absorbed from the acid gas stream in step (C) in an aqueous alkanolamine absorbent.

4. The method of claim 2 wherein the concentration of the alkanolamine is from 5 to 60 percent by weight.

5. The method of claim 4 wherein the $H_2S$ is absorbed from the acid gas stream in step (C) in an aqueous alkanolamine absorbent.

6. The method of claim 5 wherein the alkanolamine of step (C) is present in an amount of from about 5 to 60 percent by weight.

7. The method of claim 4 wherein the concentration of the alkanolamine is from 25 to 50 percent by weight.

8. The method of claim 6 wherein the alkanolamine is present in an amount of from 25 to 50 percent by weight.

9. The method of claim 5 wherein the tetramethylene sulfone is present in an amount of from 5 to 45 percent by weight.

10. The method of claim 4 wherein the tetramethylene sulfone is sulfolane.

11. The method of claim 10 wherein the alkanolamine of step (A) is diisopropanolamine.

12. The method of claim 11 wherein the alkanolamine of step (C) is diisopropanolamine.

* * * * *